Dec. 13, 1960   R. E. MAYER ET AL   2,964,709
APPARATUS FOR SETTING A FUNCTION GENERATOR
Filed Dec. 31, 1957   3 Sheets-Sheet 1

Fig. 1A
Fig. 1B
Fig. 2

To Positioning Motors

INVENTORS
ROBERT E. MAYER
ARNOLD TEPFER
BY
B. F. Spencer
AGENT

Dec. 13, 1960   R. E. MAYER ET AL   2,964,709
APPARATUS FOR SETTING A FUNCTION GENERATOR
Filed Dec. 31, 1957   3 Sheets-Sheet 3

Fig. 4

INVENTORS
ROBERT E. MAYER
ARNOLD TEPFER
BY
R. F. Spencer
AGENT

United States Patent Office 2,964,709
Patented Dec. 13, 1960

2,964,709

APPARATUS FOR SETTING A FUNCTION GENERATOR

Robert E. Mayer, Glen Cove, and Arnold Tepfer, New York, N.Y., assignors to Reeves Instrument Corporation, Garden City, N.Y., a corporation of New York Filed Dec. 31, 1957, Ser. No. 706,351

18 Claims. (Cl. 328—143)

This invention relates to function generator systems, and in particular to an improved method and apparatus for setting function generators.

In the utilization of analog computers it is often necessary to generate arbitrary functions. A number of devices have been developed for this purpose, one of the most commonly used being the diode function generator. Function generators of this type usually comprise a plurality of biased diode channels, each producing an output voltage having a magnitude that increases linearly with input voltage when the magnitude of the input voltage is increased beyond a predetermined value. The value of the input voltage which will just cause conduction of a particular diode channel is called the break-point voltage and is generally controlled by varying the bias potential between one terminal of the diode and ground. The ratio of the incremental change in function generator output voltage to the incremental change in input voltage producing it is defined as the slope of the generator function, and apparatus is usually provided for controlling the contribution of each diode channel to the total slope. The output voltage generated by each diode channel operating alone may be described as a ramp voltage, or segment, to distinguish it from the line segments formed by combining the outputs of the various diode channels. A given arbitrary function may be simulated by summing the ramp outputs of each of the diode channels to obtain a total output voltage approximating the desired function by a series of linear segments.

Considerable time and effort is often expended in manually adjusting the transfer characteristic of a diode function generator to produce a desired function. A series of straight lines is first selected which best approximates the desired function and each of these lines is defined by the coordinates of two or more points. The function generator transfer characteristic is then adjusted so that when a voltage proportional to the independent variable is applied to the function generator input terminals an output voltage proportional to the dependent variable is obtained. To accomplish this, each diode channel of the function generator is usually calibrated by alternately adjusting and readjusting its slope and break-point controls, with all previously set channels operating, until the function generator output voltage corresponds to the points defining the line segment to be generated. An iterative procedure is required to obtain accurate calibration because non-linearities in the diode characteristics in the region where they begin conduction and any interaction between the slope and break-point adjustments make the settings mutually dependent. If it is desired to re-generate the function at a future time it may be necessary to repeat this iterative process. Merely re-setting the controls to their previously determined positions will not assure generation of the desired function since the errors introduced in setting the line segments are often cumulative.

These difficulties are overcome by the present invention which has as an important object the providing of a method and apparatus for setting a function generator quickly and without repetitive manual operations.

Another object is to provide a method and apparatus for setting a function generator which minimizes the number of adjustments required to obtain a final setting.

Still another object is to provide apparatus for setting a function generator which can readily be adapted for remote operation from keyboard operated translating equipment, punched tape, or other similar input devices and which is suitable for use with a wide variety of diode function generators.

A further object is to provide apparatus for setting a function generator which permits simultaneous calibration of both the slope and break-point adjustments.

Yet another object of the invention is to provide apparatus for setting a function generator which varies the rate of setting the break-point adjustment as a function of the slope of the segment being set.

An additional object is to provide apparatus for setting a function generator which has a high signal-to-noise ratio during the setting operation.

In the present invention, apparatus is provided which permits a function generator to be set rapidly and accurately without the painstaking and tedious steps required by manual calibration methods. Each diode channel is calibrated individually, with all other channels de-energized, by continuously and simultaneously adjusting its slope and break-point controls until the desired output voltage is obtained.

The slope and break-point controls are positioned in accordance with error signals derived from the periodic comparison of the function generator output voltage with a pair of reference voltages. The function generator output voltage during calibration consists of the sum of two component voltages which are produced by two separate input voltages. The first input voltage has a constant magnitude proportional to a selected value of the independent variable and produces an output voltage component having a constant magnitude. The second input voltage alternates between zero and a fixed magnitude and produces a corresponding component in the output which is alternately zero and equal to the fixed magnitude voltage multiplied by the slope of the ramp segment being set. The values of the reference voltages are derived from the coordinates of the ramp segment to be generated. One of these is made proportional to the desired ordinate of the ramp segment corresponding to the constant magnitude input voltage applied to the diode channel and is used as a reference voltage in positioning the break-point control. It is compared with the constant magnitude function generator output voltage component produced by the first input voltage. The other reference voltage is proportional to the slope of the desired ramp segment and is compared to the peak-to-peak magnitude of the function generator output voltage component produced by the second input. This latter reference voltage is used in positioning the slope control.

In one form of apparatus used to carry out this method, the slope and break-point controls of the function generator are adjusted by first and second servo positioning motors. These motors are selectively energized by the output of the function generator and by the reference voltages. The reference voltage coupled to the first servo positioning motor is obtained from a slope generator which comprises apparatus for transforming a pair of incremental input voltages to a voltage proportional to the slope of the desired transfer characteristic. In addition, the slope generator includes a calibration voltage generator which produces an output voltage of fixed magnitude. The reference voltage coupled to the second servo positioning motor is obtained from position generating circuits which generate and store the voltage proportional to the desired ordinate of the ramp segment until it is required for setting the function generator. The first input voltage is coupled through an input amplifier and a selector switch to the input of the function generator. The second input voltage is obtained by periodically coupling the calibration voltage generator to the input amplifier. Switching circuits which couple the calibration voltage generator to the input amplifier are also used, in conjunction with a resistor network, to selectively energize the servo positioning motors as will be disclosed in detail hereinafter.

The above objects of and the brief introduction to the present invention will be more fully understood and further objects and advantages will become apparent from the following detailed description, the appended claims, and the drawings of which.

Figures 1A, 1B, 2:
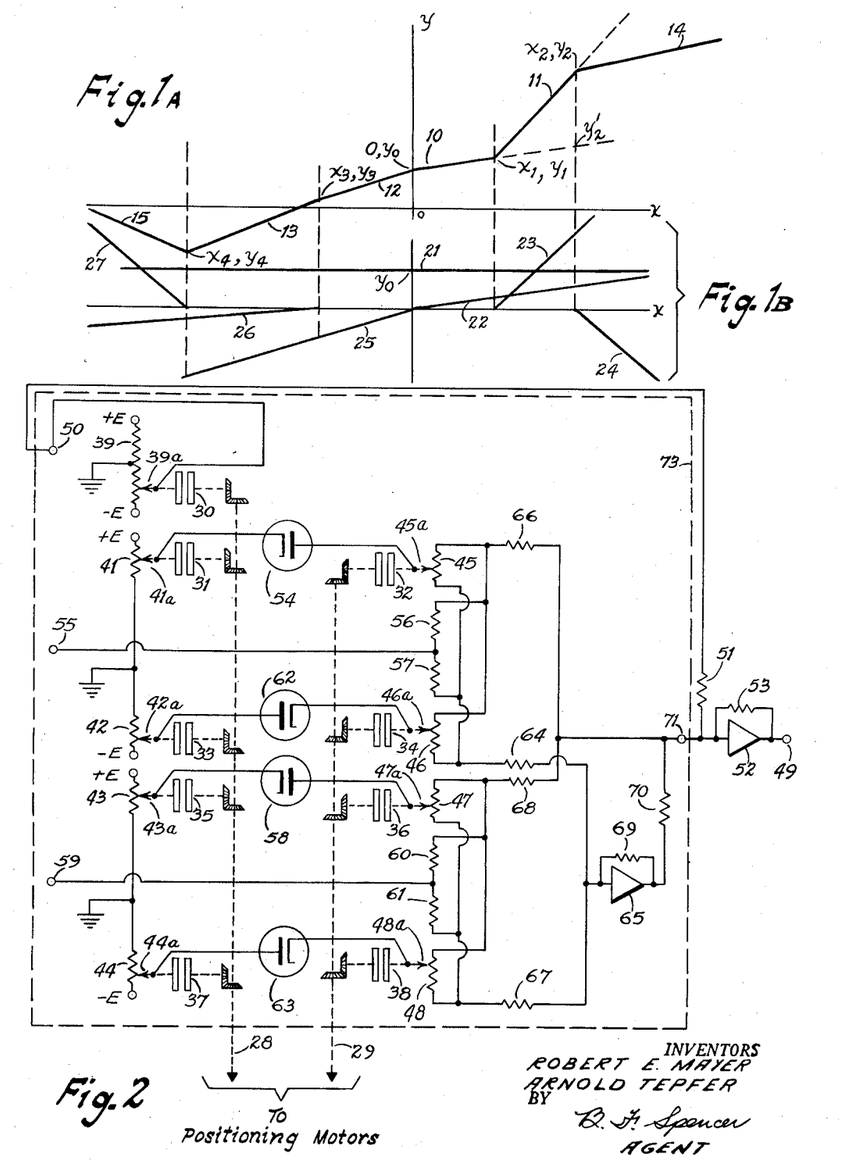
Fig. 1A represents an approximation to a given arbitrary function by a series of straight line segments.
Fig. 1B depicts the ramp segments which may be combined to obtain the approximation of Fig. 1A.
Fig. 2 is a schematic representation of one form of function generator which may be used in conjunction with this invention.

Fig. 1A depicts a graph composed of a series of straight lines approximating an arbitrary function $y=f(x)$, where $x$ is the independent and $y$ the dependent variable. Line segments 10—13 are completely defined by the $x$, $y$ co-ordinates of their end points. Line segments 14 and 15, each having only one designated end point, are partially defined by the coordinates of their end points and their slope.

The graph of Fig. 1A may be synthesized by combining the zero slope and ramp segments shown in Fig. 1B. Thus, line segment 10 may be obtained by adding zero slope segment 21 which has an ordinate equal to $y_0$ for all values of $x$ to ramp segment 22, ramp 22 having a break-point at the origin and a slope equal to the slope of line segment 10. The addition of segments 21 and 22 will result in a curve having an ordinate equal to $y_0$ for all negative values of $x$ and a constantly increasing ordinate for all positive values of $x$. Similarly, line 11 may be formed by adding ramp segment 23, having a break-point at $x_1$, to the line already generated. The slope of ramp 23 is established by making its ordinate at $x_2$ equal $y_2-y_2'$, where $y_2'$ is the $y$ coordinate of the extension of line segment 10 at $x_2$. In the same way, the change in slope required to produce line 14 may be obtained by adding ramp 24, having a break-point at $x_2$, to lines 10 and 11. The ordinate of ramp 24 is equal to the difference between the ordinates of segment 11 (extended) and segment 14 for all values of $x$ greater than $x_2$. This process may be extended for negative values of $x$, a new segment being added each time a change in slope is required to approximate the arbitrary function.

A typical diode function generator which may be adapted to generate and combine ramp segments to produce desired arbitrary functions is shown in Fig. 2. This function generator is of a type well known in the art and is similar to that shown in Fig. 6.26c, page 297, Korn and Korn, Electronic Analog Computers, 2nd edition, published by McGraw-Hill Book Company, Inc. Many other types of diode function generators have also been developed, most of these being suitable for use with the present invention.

The function generator of Fig. 2 is provided with sufficient diode channels to generate the portion of the curve of Fig. 1A comprising line segments 10—13. If a curve having more line segments is to be generated, as is often the case, additional diode channels may be connected in parallel with those shown.

The conventional function generator has been modified by adding externally driven shafts 28 and 29 together with clutches 30—38 to permit remote operation of the constant term potentiometer 39, break-point potentiometers 41—44, and slope potentiometers 45—48. Clutches 30—38 may be electrically operated apparatus to be described hereafter to permit selective adjustment of the potentiometers coupled to shafts 28 and 29.

Since the function generator of Fig. 2 is of a known type, its circuit together with a procedure which may be used to manually calibrate it will be described only briefly. A voltage proportional to the zero slope segment 21 of Fig. 1B is produced at output terminal 49 of the function generator by adjusting potentiometer arm 39a until an output voltage corresponding to $y_0$ is obtained. Potentiometer arm 39a is coupled through function generator input terminal 50 and resistor 51 to output amplifier 52 having feedback resistor 53.

To generate ramp segment 22, break-point potentiometer arm 41a is set at zero volts thereby causing diode 54 to conduct for all positive voltages applied between input terminal 55 and ground. Terminal 55 is coupled by resistor 56 to one end of parallel-connected slope potentiometers 45 and 46 and to the other end by resistor 57. The slope of ramp 22 is set by positioning arm 45a of slope potentiometer 45 to produce an output voltage which increases with an increase in input voltage in accordance with line segment 10.

Ramp 23 may be generated by setting arm 43a of break-point potentiometer 43 to permit conduction of diode 58 for any value of voltage applied to input terminal 59 greater than that corresponding to $r-x_1$. Terminal 59 is coupled to one end of parallel-connected slope potentiometers 47 and 48 by resistor 60 and to the other end by resistor 61. The slope of ramp 23 is set by adjusting potentiometer arm 47a until, with an input voltage greater than that proportional to $x_1$ applied to both terminals 55 and 59, the voltage appearing at output terminal 49 corresponds to a point on line 11. Since the break-point and slope adjustments are mutually dependent it may be necessary to alternately readjust potentiometer arms 43a and 47a until the desired output voltage is obtained for all values of input voltage greater than $x_1$.

Similarly, ramp segment 25 may be generated by setting potentiometer arm 42a at zero volts, thereby causing diode 62 to conduct for all negative values of voltage applied to input terminal 55, and by setting potentiometer arm 46a for the desired slope. Ramp 26 is generated by setting potentiometer arm 44a to permit conduction of diode 63 for all values of input voltage more negative than $x=x_3$ and by properly adjusting arm 48a of slope potentiometer 48. Parallel-connected slope potentiometers 45 and 46 have one end coupled through resistor 64 to the input of amplifier 65 and the other end through resistor 66 to amplifier 52. In the same way, parallel-connected potentiometers 47 and 48 have one end connected through resistor 67 to amplifier 65 and the other end through resistor 68 to amplifier 52. The output of amplifier 65, having a feedback resistor 69, is connected through resistor 70 and terminal 71 to the input of amplifier 52.

If the arm of a slope potentiometer is set at its midpoint, equal voltages are applied to differentially connected amplifiers 52 and 65, resulting in a zero contribution from that channel to the net output voltage. As the arm is displaced from the midpoint of the slope potentiometers, unequal voltages are applied to amplifiers 52 and 65 and the contribution to the output voltage produced at terminal 49 will be either positive or negative depending on the direction in which the arm of the slope potentiometer was moved.

Figures 3A, 3B, 5:
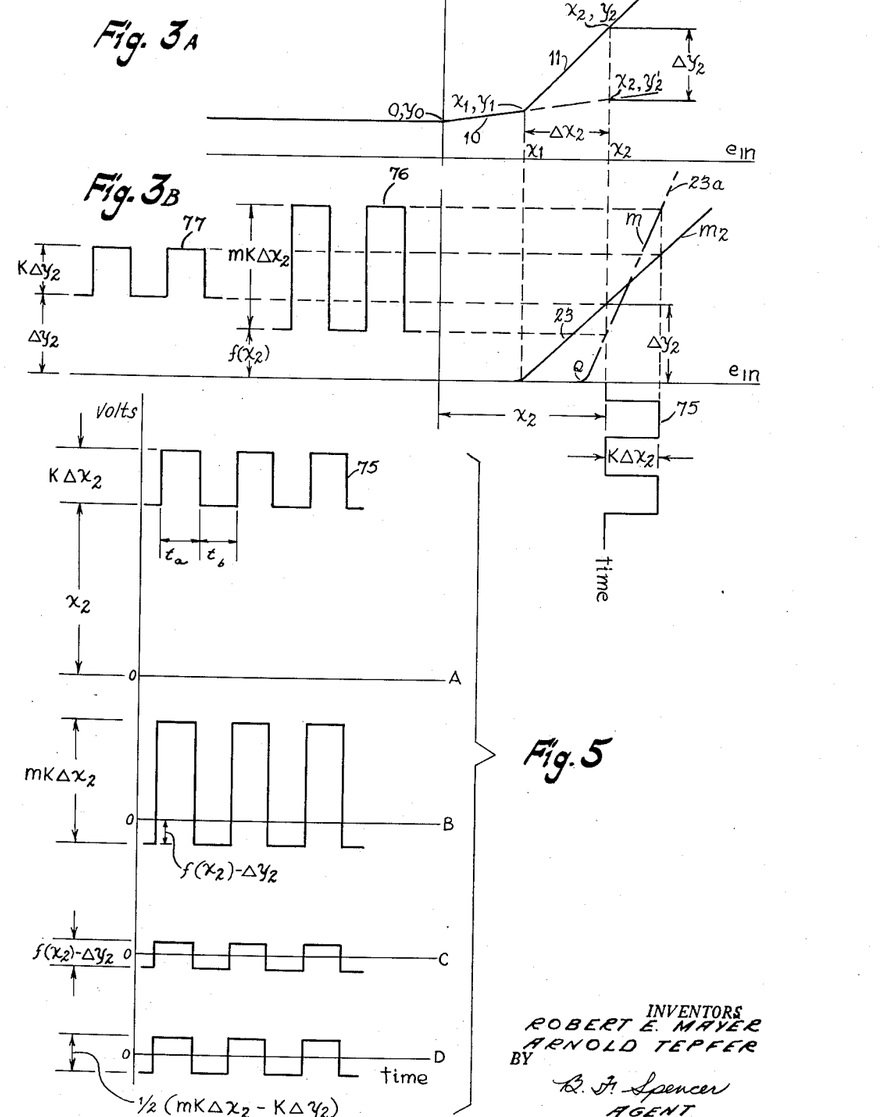
Figs. 3A and 3B show portions of Figs. 1A and 1B together with voltage-time waveforms useful in explaining the invention.
Fig. 5 shows curves representing the waveforms of signals which occur at various portions of the system of Fig. 4.

The principle of operation of the present invention may best be understood by referring to Fig. 3A which shows portions of the curves of Figs. 1A and 1B.

The coordinate axes have been re-labeled to indicate that Fig. 3A is a plot of the function generator input vs. output voltage, where the function generator input voltage is proportional to the independent variable $x$ and the output voltage is proportional to the dependent variable $y$ of the arbitrary function to be generated.

In the following explanation it is assumed that the diode function generator has already been set to generate segment 10 and that segment 11 is the next to be calibrated. If a voltage equal to $x_2$ is applied to the input terminals of the function generator, an output voltage $y_2'$ will be obtained as shown graphically by the extension of segment 10. Subtracting $y_2'$ from $y_2$, the coordinate of the desired value of $y$, gives an incremental voltage $$\Delta y_2 = y_2 - y_2'$$

which represents the voltage that is to be generated by the diode channel being calibrated when the function generator input voltage is equal to $x_2$.

The algebraic difference between $x_2$ and break-point $x_1$ is defined as the incremental voltage $$\Delta x_2 = x_2 - x_1$$

which, together with $\Delta y_2$ and $x_2$, provides sufficient information to establish the settings of the break-point and slope potentiometers of the function generator diode channel selected to generate ramp voltage 23.

Fig. 3B is a plot of the output voltage of the function generator with all diode channels de-energized with the exception of the one to be calibrated. Dotted line 23a represents the function generator output voltage which might be obtained with the slope and break-point potentiometers incorrectly set, as would normally be the case when the channel is first energized. By applying a periodic voltage 75, having an amplitude equal to $x_2$ during one portion of its cycle and equal to $x_2 + K\Delta x_2$ during the balance of the cycle, to the input of the function generator an output voltage 76 will be produced. In the expression $K\Delta x_2$, $K$ is a variable factor selected so that the voltage $K\Delta x_2$ will have a constant predetermined magnitude regardless of the value of $\Delta x_2$.

The function generator output voltage 76 obtained during the intervals when the input voltage 75 is equal to $x_2$ may be designated $f(x_2)$, while the output voltage resulting from an input voltage equal to $x_2 + K\Delta x_2$ is $f(x_2) + mK\Delta x_2$, where $m$ is the slope of the ramp output voltage. If the function generator were properly calibrated to produce ramp segment 23, the output voltage 77 would be equal to $\Delta y_2$ when the input voltage equals $x_2$ and equal to $\Delta y_2 + K\Delta y_2$ when the input voltage is equal to $x_2 + K\Delta x_2$. By adjusting the slope potentiometer until the output voltage $$mK\Delta x_2 = K\Delta y_2$$

and, therefore, $$m = \frac{\Delta y_2}{\Delta x_2} = m_2$$

ramp 23a will be pivoted around a point Q until its slope is equal to $m_2$, thereby causing ramp 23a to be parallel to the desired ramp 23. Ramp 23a may then be moved parallel to itself until it passes through the point $x_2$, $\Delta y_2$ by adjusting the break-point potentiometer until $$f(x_2) = \Delta y_2$$

Since the slope of the function generator output voltage is used to position the slope potentiometer directly, the diode curvature near the break-point does not effect the settings. If the function generator is designed so that there is no interaction between the break-point and slope potentiometers, the iterative procedure previously outlined is not required for accurate calibration. Each channel of the function generator may be calibrated by merely adjusting the break-point potentiometer to make the diode begin conduction at a voltage not greater than $x_2$, adjusting the slope potentiometer for the desired value $m_2$, and finally re-adjusting the break-point potentiometer so that the function generator output is $\Delta y_2$ when the input is $x_2$.

Figure 4:
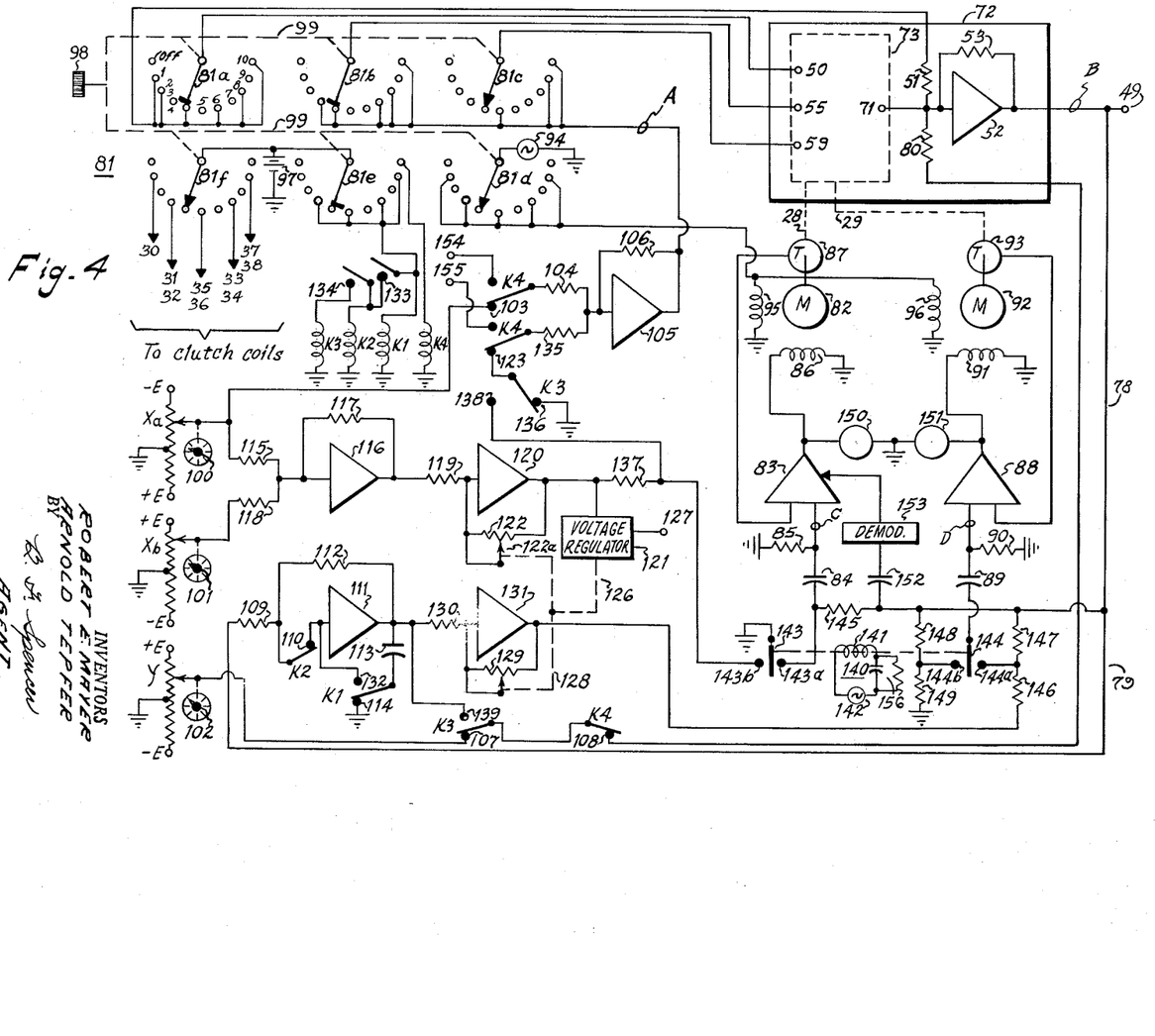
Fig. 4 illustrates a block diagram of a preferred embodiment of the present invention.

A preferred embodiment of the apparatus for calibrating a function generator is shown in the schematic block diagram of Fig. 4. In order to conserve space, function generator 72 is represented by amplifier 52 and dotted enclosure 73 containing the circuits shown in detail in Fig. 2. An additional input has been coupled through resistor 80 to amplifier 52 and one deck of a selector switch 81 has been interposed between function generator terminal 50 and resistor 51.

Shaft 28, which is coupled through clutches 30, 31, 33, 35 and 37 to constant term potentiometer 39 and break-point potentiometers 41—44 respectively is driven by two phase motor 82. A servo amplifier 83, having an input network comprising capacitor 84 and resistor 85, is coupled to the control winding 86 of motor 82. Rate feedback is provided by connecting the output of motor driven tachometer 87 to the input of amplifier 83. Similarly, servo amplifier 88, having an input network comprising capacitor 89 and resistor 90, is connected to the control winding 91 of two-phase motor 92, thereby driving shaft 29 and positioning slope potentiometers 45—48. Tachometer 93 is coupled to motor 92 and its output voltage impressed across the input of amplifier 88 to provide rate feedback for the slope servo.

Selector switch 81 having decks 81a to 81f is provided to permit selective energization of input terminals 50, 55 and 59 of function generator 72 and to control the function generator calibrating circuits. Deck 81a has been interposed between function generator terminal 50 and resistor 51 so that the voltage between the arm of potentiometer 39 and ground can be removed from output amplifier 52 when required during the setting sequence. The selector arms of decks 81b and 81c are connected to input terminals 55 and 59 respectively to permit coupling of an input voltage to the function generator when required for the calibration or operation of the generator. Deck 81d connects alternating voltage source 94 to reference windings 95 and 96 of motors 82 and 92 respectively while decks 81e and 81f couple unidirectional control voltage source 97 to relays K1—K4 and clutches 30—38 respectively. Elongated selector arms are provided for decks 81a, 81b and 81e to prevent removal of the input voltage from terminals 50 and 55 and to permit energizing relays K1—K3 while the selector switch is being moved from one position to the next. Knob 98 is provided to permit manual positioning of the selector arms of decks 81a to 81f through mechanical linkage 99. If desired, an electrically operated stepping switch or similar device may be used in place of manually operated selector switch 81 to obtain remote or automatic operation.

Three potentiometers $X_a$, $X_b$, and $Y$, each provided with a grounded center tap and having one end connected to a source of positive potential, $+E$, and other end to a source of negative potential, $-E$, are used to generate the input data needed in setting the function generator. These potentiometers, having calibration scales, may be manually operated by control knobs 100—102. It is also possible to control them remotely from some suitable input device such as an electric typewriter of the type producing an output voltage corresponding to the key depressed by an operator or a punched tape mechanism, manual control being shown here to avoid complicating the disclosure.

One procedure that might be used in calibrating function generator 72 using this invention is to first set the zero slope term, then the ramp functions corresponding to positive values of the independent variable $x$, and finally the ramp functions corresponding to negative values of $x$. Assume, as was done in the description of Fig. 3, that potentiometers 39, 41 and 45 have been properly calibrated to generate line segment 10, and that line segment 11 is the next to be set.

To generate incremental voltage $\Delta y_2$ (Fig. 3), selector switch 81 is turned to position 4, position 1 having been used to set the zero slope term 21 and positions 2 and 3 to set ramp segment 22 as will be explained hereinafter. The reference windings of motor 82 and 92 are de-energized in this position of selector switch 81 as are relays K1 to K4 and clutches 30 to 38. The arm of potentiometer $X_a$ is adjusted by means of knob 100 to a value proportional to $x_2$, as indicated on its calibration scale, and is coupled through contact 103 of relay K4, resistor 104, inverting amplifier 105 having feedback resistor 106, and deck 81b of selector switch 81 to function generator input terminal 55. It shall be noted that the voltage appearing between the arm of potentiometer $X_a$ and ground is actually proportional to $-x_2$ but the voltage applied to the function generator input terminal 55 is positive due to the inverting action of amplifier 105. Since the voltage between the arm of potentiometer 39 and ground is coupled through deck 81a of selector switch 81 to the input of amplifier 52, the voltage $y_2'$ appearing at output terminal 49 is produced by the sum of the voltages on the arm of potentiometer 39 and that due to conduction of the channel including diode 54. The arm of potentiometer Y, which is calibrated in terms of the negative of the voltage that it produces at output terminal 49 is set to a value that is proportional to $y_2$ and coupled through contacts 107 and 108 of relays K3 and K4, and resistor 80 to the input of amplifier 52. The voltage appearing at output terminal 49 due to these three input voltages is $$-\Delta y_2 = y_2' - y_2$$

This voltage, $-\Delta y_2$, is coupled over leads 78 and 79, and through resistor 109 and contact 110 of relay K2 to the input of amplifier 111, amplifier 111 having a feedback resistor 112. The values of resistors 109 and 112 are so proportioned that the voltage appearing at the output of amplifier 111 is equal to $+\Delta y_2$. Voltage $\Delta y_2$ is stored by a capacitor 113, which has one terminal coupled to the output of amplifier 111 and the other connected through contact 114 of relay K1 to ground.

Incremental voltage $\Delta x_2$ is obtained by setting the arm of potentiometer $X_b$, by means of knob 101, to a value proportional to $x_1$ and combining it with the output voltage of potentiometer $X_a$. The arm of potentiometer $X_a$ is coupled through resistor 115 to amplifier 116, having feedback resistor 117, while the arm of potentiometer $X_b$ is coupled through resistor 118 to the input of amplifier 116. The values of resistors 115, 118 and 117 are selected so that the voltage appearing at the output of amplifier 116 is equal to $$\Delta x_2 = x_2 - x_1$$

Voltage $\Delta x_2$ is coupled through resistor 119 to feedback amplifier 120 having a voltage regular 121 connected to its output terminals. One function of regulator 121 is to adjust the arm 122a of feedback potentiometer 122 so as to maintain a constant predetermined voltage at the output of amplifier 120.

A second function is to adjust potentiometer arm 129 to make the gain of amplifier 131 equal to the gain of amplifier 120. Voltage regulator 121 may be of any suitable type as, for example, a servo driven unit having an output shaft 126 which adjusts potentiometer arm 122a until the regulator input voltage is equal in magnitude to a predetermined reference voltage applied to terminal 127. Thus, amplifier 120 together with its associated resistors and regulator 121 transforms voltage $\Delta x_2$ into a voltage of constant magnitude $-K\Delta x_2$, where the gain K is varied by changing the feedback resistance of amplifier 120. Regulator 121 is coupled by mechanical connection 128 to the arm of feedback potentiometer 129, the ratio of the resistance of potentiometer 129 to resistor 130 being varied in exactly the same proportion as the ratio of feedback potentiometer 122 to resistor 119.

The voltage at the output of amplifier 111, $\Delta y_2$, is coupled through resistor 130 to amplifier 131, and since it is multiplied by the same factor K as $\Delta x_2$, the voltage at the output of amplifier 131 is equal to $-K\Delta y_2$. Since $-K\Delta x_2 = -C$ (a constant)

$$K = \frac{C}{\Delta x_2}$$

and $$-K\Delta y_2 = -C\frac{\Delta y_2}{\Delta x_2} = -Cm_2$$

Thus, the output of amplifier 131, $-K\Delta y_2$, is proportional to the desired slope $m_2$ of ramp segment 23.

Selector switch 81 is next turned to position 5 thereby disconnecting the input to function generator terminals 50 and 55, connecting the output of amplifier 105 to terminal 59, and energizing the reference windings to servo motors 82 and 92. In position 5, selector switch 81 further energizes the coils (not shown) of electro-magnetic clutches 35 and 36 and sequentially picks up relay coils K1, K2 and K3.

When the coil of relay K1 is energized by voltage source 97 through selector switch deck 81e, one arm of relay K1 disconnects capacitor 113 from ground and reconnects it, through contact 132, to the summing junction of amplifier 111. The other arm of relay K1 picks up the coil of relay K2 through contact 133 thereby opening contact 110 and disconnecting resistors 109 and 112 from the summing junction of amplifier 111. Since capacitor 113 was charged to the voltage $\Delta y_2$, switching it across amplifier 111 and removing all other inputs stores this voltage at the output of amplifier 111. Relay K2 also energizes the coil of relay K3 through contact 134, relay K3 removing the ground from resistor 135 by opening contact 136 and connecting the output of amplifier 120 through isolating resistor 137, contact 138 of relay K3, contact 123 of relay K4, and resistor 135 to the input of amplifier 105. Relay K3 also opens contact 107 thereby disconnecting the arm of potentiometer Y from the input to amplifier 52 and connecting the stored output $\Delta y_2$ of amplifier 111 through contact 139 of relay K3, contact 108 of relay K4 and resistor 80 to the input of amplifier 52.

A chopper 140 is provided with a coil 141 which is energized through phase shifting network 156 from an alternating voltage source 142 of the same frequency and phase as voltage source 94. Armatures 143 and 144, forming part of chopper 140 are arranged to oscillate between stationary contacts 143a, 143b and 144a, 144b respectively. Armature 143 is connected to ground while armature 144 is coupled to servo amplifier 88 through capacitor 89. The chopper is so phased that armature 143 grounds contact 143a during the interval $t_a$ while, at the same time, armature 144 couples contact 144a to capacitor 89. During the remainder of the cycle, $t_b$, armature 143 connects contact 143b to ground while armature 144 is touching contact 144b. Contact 143a is connected to the junction of resistor 145 and capacitor 84, and contact 143b is coupled to the junction between resistor 137 and contact 138 of relay K3. A pair of series-connected resistors 147 and 146 are coupled between the output terminal 49 of function generator 72 and the output of amplifier 131, and a second pair of series-connected resistors 148 and 149 are coupled between terminal 49 and ground. Resistors 146 and 147 are equal to each other as are resistors 148 and 149. The junction of resistors 146 and 147 is connected to contact 144a, and the junction of resistors 148 and 149 is connected to contact 144b.

The output of amplifier 120, $-K\Delta x_2$, is applied to amplifier 105 through resistors 137 and 135 during the chopper cycle interval $t_a$ when the contact 143a is grounded. During the other half of the cycle $t_b$, the $-K\Delta x_2$ input to amplifier 105 is shorted to ground through contact 143b and armature 143 of the chopper.

The voltage between the arm of potentiometer $X_a$ and ground, $-x_2$, is continuously applied during this portion of the setting procedure to inverting and summing amplifier 105 through resistor 104. The voltage at terminal 59 of the function generator is, therefore, equal to $x_2$ during the interval $t_b$ and $x_2+K\Delta x_2$ during the interval $t_a$. This waveform 75 is shown in Figs. 3B and 5A.

Since the breakpoint potentiometer 43 and slope potentiometer 47 were assumed to be initially set to produce the characteristic curve 23a of Fig. 3B, the voltage appearing at terminal 49 will be the function generator output voltage 76 minus the output of amplifier 111, $\Delta y_2$. As shown in Fig. 5B, the voltage at terminal 49 has a peak-to-peak amplitude of $mK\Delta x_2$ and a magnitude equal to $f(x_2)-\Delta y_2$ during the portion of the cycle, $t_b$, that the function generator input voltage equals $x_2$. This voltage is applied over lead 78, through resistor 145, and capacitor 84 to amplifier 83 only during the portion of the chopper cycle, $t_b$, that contact 143a is not grounded by armature 143. That is, there is an input voltage applied to capacitor 84 only during the time that the input to function generator 72 equals $x_2$. The voltage across resistor 85, therefore, has a peak-to-peak magnitude equal to:

$$f(x_2)-\Delta y_2$$

and an average value of zero over an integral number of cycles as shown in Fig. 5C. Servo motor 82 drives the arm of potentiometer 43 in response to this voltage in the direction required to make $f(x_2)$ equal to reference voltage $\Delta y_2$. When $f(x_2)=\Delta y_2$ the voltage across resistor 85 becomes zero, motor 82 stops rotating, and potentiometer arm 43 is correctly positioned.

Simultaneously, the output voltage shown in Fig. 5B is applied through chopper armature 144 and capacitor 89 to the input of amplifier 88. During the interval $t_a$ when the input voltage to function generator 72 is equal to $x_2+K\Delta x_2$, the voltage to capacitor 89 is equal to:

$$\frac{f(x_2)+mK\Delta x_2-\Delta y_2}{2}-\frac{K\Delta y_2}{2}$$

The first term of the expression is obtained from the output of amplifier 52 and is applied to chopper armature 144 through resistor 147 and chopper contact 144a while the second term is obtained from amplifier 131 and is applied through resistor 146 and contact 144a. During the other half of the cycle, $t_b$, while the input voltage of the function generator is $x_2$, the voltage applied to capacitor 89 is:

$$\frac{f(x_2)-\Delta y_2}{2}$$

This voltage is obtained from the junction of resistors 148 and 149 and is coupled to the input of amplifier 88 through contact 144b and armature 144 of chopper 140.

The total voltage impressed across resistor 90 in one cycle is, therefore, equal to the alternating component of the voltage applied to capacitor 89 and is:

$$\frac{f(x_2)+mK\Delta x_2-\Delta y_2-K\Delta y_2}{2}-\frac{f(x_2)-\Delta y^2}{2}$$
$$=1/2(mK\Delta x_2-K\Delta y_2)$$

as shown in Fig. 5D.

This voltage across resistor 90 is amplified and applied to motor 92 to drive arm 47a of slope potentiometer 47 in such a direction as to reduce the input voltage to amplifier 88 to zero. When the voltage to control winding 91 of motor 92 is zero, $mK\Delta x_2$ will equal $K\Delta y_2$ and the slope of the function being generated will be:

$$m=m_2=\frac{\Delta y_2}{\Delta x_2}$$

as desired.

When the slope and break point servos have been set to produce the desired ramp segment, null detecting volt meters 150 and 151 will indicate this condition and the operator may proceed to set the next segment. If a stepping switch is used instead of selector switch 81, detectors 150 and 151 may be of a type that can be adapted to move the switch automatically to its next position. The time required for the break-point servo motor 82 to set the break-point potentiometer is determined, not only by the break-point error, but also by the slope setting of the diode channel. If the slope is low the gain of the function generator will be low and operation of motor 82 will tend to be highly damped. On the other hand, if the slope potentiometer is set for a large slope the gain of the function generator will be high and the response of the break-point servo will be rapid and may cause sustained oscillation. To compensate for changes in the gain of the function generator with slope, the output of amplifier 52, having a peak-to-peak magnitude proportional to the slope $m$ (Fig. 5B), is coupled by capacitor 152 to demodulator 153 and the resulting D.C. voltage used to control the gain of amplifier 83. The gain of amplifier 83 is made to vary inversely with slope by any suitable automatic gain control (AGC) circuit thereby eliminating the effect of changes in the function generator gain on the stability of the break-point servo system.

It may also be found desirable to provide an AGC signal for controlling the gain of the slope servo amplifier 88. In some types of function generators this will be necessary since the generator slope does not vary linearly with the setting of the slope potentiometer due to the loading on this potentiometer. An important advantage is, therefore, obtained from this invention in that a signal proportional to the slope of the segment being set may be taken directly from the output of the function generator without any additional equipment.

Having described one embodiment of the function generator setting apparatus and a method for setting a ramp function, a procedure which might be followed in generating the portion of the curve of Fig. 1A made up of line segments 10—13 will be outlined.

The first step is to generate the zero slope term 21 (Fig. 1B). This may be accomplished by turning selector switch 81 to position 1, and setting potentiometer Y to $y_0$. Arm 39a of potentiometer 39 is connected through deck 81a to the input of amplifier 52 while the arm of potentiometer Y is also coupled to amplifier 52. The output of amplifier 52 is coupled to the input of servo amplifier 83 energizing break-point motor 82 causing it to drive the arm of potentiometer 39 through clutch 30 in the direction required to make the function generator output voltage equal $y_0$. Only potentiometer 39 will be adjusted during this step since clutch 30 is the only one energized through deck 81f of selector switch 81. When potentiometer 39 has been properly adjusted, the function generator output voltage will equal zero and null detector 150 will indicate that motor 82 has stopped rotating.

Selector switch 81 is next turned to position 2, potentiometer $X_a$ set at $x_1$, potentiometer $X_b$ at zero and potentiometer Y at $y_1$. During this step the reference voltage, $\Delta y_1=y_1-y_0$, is obtained and stored across capacitor 113. The reference windings of servo motors 82 and 92 and all clutches are de-energized by switch 81, only the arm of potentiometer 39 being coupled through deck 81a to amplifier 52. The output of amplifier 52 is $-\Delta y_1$, this voltage being coupled to amplifier 111, inverted, and used to charge capacitor 113 to $\Delta y_1$.

During the next step, position 3 of switch 81, ramp segment 22 is set. Potentiometers $X_a$, $X_b$ and Y are maintained at the settings they were given in step 2 while function generator input terminal 55 is connected to the output of amplifier 105. Alternating voltage is applied to the reference windings of motors 82 and 92, relays K1–K3 are sequentially energized and clutches 31 and 32 are engaged. The input to terminal 55 of the function generator consists of the voltage $x_1$ from potentiometer $X_a$ plus the periodic constant amplitude voltage obtained from the output of amplifier 120. The output of amplifier 52 is coupled to amplifiers 83 and 88 to drive the arms of break-point potentiometer 41 and slope potentiometer 45 simultaneously to set the function generator to produce ramp 22. Capacitor 113, which was charged to $\Delta y_1$, is switched by operation of relays K1 and K2 across amplifier 111 thereby holding this voltage at the output of amplifier 111. Voltage $\Delta y_1$ is then multiplied by K by amplifier 131 and coupled to resistor 146 to provide a reference voltage for slope servo amplifier 88.

After servo motors 82 and 92 have nulled, as indicated by null detectors 150 and 151, ramp 23 is set. This is accomplished by obtaining $\Delta y_2$ with selector switch 81 in position 4 and then setting potentiometers 43 and 47 with switch 81 in position 5 as has already been described in some detail.

The procedure to be followed in setting the left hand side of the $x$—$y$ plane is essentially the same as that followed in setting the right hand side. With switch 81 in position 6, potentiometer $X_a$ is set at $x_3$, potentiometer $X_b$ at zero, and potentiometer Y at $y_3$. Voltage $\Delta y_3 = y_3 - y_0$ is thereby stored across capacitor 113 and switch 81 is then turned to position 7 to set potentiometers 42 and 46 to generate ramp 25. In position 7 of switch 81 the output of amplifier 105 is fed to terminal 55 of the function generator. Potentiometers 42 and 46 are driven by motors 82 and 92 through clutches 33 and 34 respectively until ramp 25 is set and the servos are nulled.

To obtain $\Delta y_4$ switch 81 is turned to position 8, potentiometer $X_a$ to $x_4$, potentiometer $X_b$ to $x_3$, and potentiometer Y to $y_4$. Segments 10 and 12 may be generated in this position since constant term potentiometer 39 is connected through deck 81a while function generator terminal 55 is energized through deck 81b of the selector switch so that either diode 54 or 62 may be made to conduct depending on the polarity of the signal from amplifier 105. Voltage $\Delta y_4$ is stored across capacitor 113 during this step to be used in the following step as a reference voltage in setting ramp 26. With the selector switch in position 9 electro-magnetic clutches 37 and 38 are energized coupling the arms of potentiometers 44 and 48 to motors 82 and 92 respectively while the input to the function generator is $x_4$ plus the periodic constant amplitude output voltage of amplifier 120.

After the servos have nulled, the function generator will have been set to generate ramp 26 in addition to the previously set ramps 22, 23, 25 and the zero slope term 21. The selector switch is then moved to position 10 which is the position for normal operation of the function generator. In this position potentiometer 39 is connected through deck 81a to terminal 50, the output of amplifier 105 is coupled through decks 81b and 81c to terminals 55 and 59 respectively, the reference windings 95 and 96 of motors 82 and 92 are de-energized, relay K4 is picked up, and all clutches are disengaged. Relay K4 connects resistors 104 and 135 to input terminals 154 and 155 respectively for normal function generator operation. In addition relay K4 disconnects the auxiliary input to amplifier 52 through resistor 80 by opening contact 108 and de-energizes the chopper coil 141 and voltage regulator 121 servo motor 124 by additional contacts not shown. The above calibration procedure is summarized in the following chart:

*Calibration procedure*

| Selector Switch (81) Position | Set | | | Operation |
|---|---|---|---|---|
| | $X_a$ | $X_b$ | Y | |
| 1 | | | $y_0$ | Potentiometer 39 is automatically set to generate zero slope term 21. |
| 2 | $x_1$ | 0 | $y_1$ | $\Delta y_1$ is measured and stored. |
| 3 | $x_1$ | 0 | $y_1$ | Potentiometers 41 and 45 are automatically set to generate ramp 22. |
| 4 | $x_2$ | $x_1$ | $y_2$ | $\Delta y_2$ is measured and stored. |
| 5 | $x_2$ | $x_1$ | $y_2$ | Potentiometers 43 and 47 are automatically set to generate ramp 23. |
| 6 | $x_3$ | 0 | $y_3$ | $\Delta y_3$ is measured and stored. |
| 7 | $x_3$ | 0 | $y_3$ | Potentiometers 42 and 46 are automatically set to generate ramp 25. |
| 8 | $x_4$ | $x_3$ | $y_4$ | $\Delta y_4$ is measured and stored. |
| 9 | $x_4$ | $x_3$ | $y_4$ | Potentiometers 44 and 48 are automatically set to generate ramp 26. |
| 10 | | | | Normal function generator operation. |

In explaining the setting of the individual ramp segments it has been assumed that the break point of the ramp has a smaller magnitude than the input voltage applied to the function generator by the setting of potentiometer $X_a$. It is entirely possible that the break point of the ramp will have a greater magnitude than the function generator input and, therefore, there will be no function generator output voltage. In this case, the reference voltage $\Delta y$ applied to amplifier 52 through resistor 80, will cause motor 82 to drive the arm of the break-point potentiometer toward zero while the slope potentiometer arm will be driven toward maximum slope. When the ramp breakpoint voltage is reduced to a value approximately equal to $x_2$ the slope potentiometer will be driven in the correct direction in accordance with the reference signal from amplifier 131.

One of the significant features of this invention is that it provides a method and apparatus for setting each channel of a function generator individually and then combining their outputs after all of the channels have been calibrated. The signal-to-noise ratio of the voltage applied to the positioning servos is, therefore, that of a single diode channel. This is in contrast to prior function generator setting apparatus wherein each channel is set with all previously calibrated channels operating. In these prior systems the signal-to-noise ratio decreases as each additional channel is energized, due to addition of the noise voltage in each channel, thereby making operation of the positioning servos less satisfactory as the number of line segments is increased.

It is also significant that the amplitude of the periodic calibration voltage used to obtain the slope positioning signal is not critical and may, in fact, have any reasonable value. Thus, in general, the breakpoint or slope of the segment to be set will have no bearing on the amplitude of the calibration voltage except when the breakpoint is near the edge of the $x, y$ plane.

As many changes could be made in the above construction and many different embodiments of this invention could be made without departing from the scope thereof, it is intended that all matter contained in the above description or shown in the accompanying drawings shall be interpreted as illustrative and not in a limiting sense.

What is claimed is:

1. Apparatus for adjusting a function generator to obtain a predetermined transfer characteristic, said function generator being provided with first and second adjustment means for varying the slope and position respectively of said transfer characteristic, comprising input means coupled to said function generator, said input means being adapted to receive an input voltage corresponding to the abscissa of a preselected coordinate point through which said transfer characteristic is to pass and being further adapted to periodically receive a calibration voltage having a constant magnitude, slope generating means for producing a voltage corresponding to the desired slope of said transfer characteristic at said preselected coordinate point, position generating means for producing a voltage corresponding to the ordinate of said preselected coordinate point, first voltage responsive positioning means having its output coupled to said first adjustment means, said first voltage responsive means having its input connected to the output of said function generator and to said slope generating means, and second voltage responsive positioning means having its output coupled to said second adjustment means, said second voltage responsive positioning means having its input connected to the output of said function generator and to said position generating means.

2. Apparatus for adjusting a function generator to obtain a predetermined transfer characteristic, said function generator being provided with first and second adjustment means for varying the slope and position respectively of said transfer characteristic, comprising input means coupled to said function generator, said input means being adapted to receive an input voltage corresponding to the abscissa of a preselected coordinate point through which said transfer characteristic is to pass and being further adapted to periodically receive a calibration voltage having a constant magnitude, first and second voltage responsive positioning means coupled respectively to said first and second adjustment means, means coupled to said first positioning means for generating a voltage corresponding to the desired slope of said transfer characteristic at said preselected coordinate point, means coupled to said second positioning means for generating a voltage corresponding to the ordinate of said preselected coordinate point, and output means coupling the function generator output voltage component produced by said calibration voltage to said first positioning means and coupling the function generator output voltage component produced by said input voltage to said second positioning means.

3. Function generating apparatus comprising a function generator provided with first and second adjustment means for varying the slope and position respectively of the transfer characteristic of said function generator; and means for adjusting the transfer characteristic of said function generator including input means coupled to said function generator, said input means being adapted to receive an input voltage corresponding to the abscissa of a preselected coordinate point through which said transfer characteristic is to pass and being further adapted to periodically receive a calibration voltage having a constant magnitude, first and second voltage responsive positioning means coupled respectively to said first and second adjustment means, means coupled to said first positioning means for generating a voltage corresponding to the desired slope of said transfer characteristic at said preselected coordinate point, means coupled to said second positioning means for generating a voltage corresponding to the ordinate of said preselected coordinate point, and output means coupling the function generator output voltage component produced by said calibration voltage to said first positioning means and coupling the function generator output voltage component produced by said input voltage to said second positioning means.

4. Apparatus for altering the slope and position of a portion of the transfer characteristic of a function generator having a plurality of channels to pass through a preselected coordinate point, said function generator being provided with at least one channel having first and second adjustment means for varying the slope and position respectively of said portion of said transfer characteristic, comprising input means coupled to said function generator, said input means being adapted to receive an input voltage corresponding to the abscissa of said preselected coordinate point and being further adapted to periodically receive a calibration voltage having a constant magnitude, first and second voltage responsive positioning means coupled respectively to said first and second adjustment means, means coupled to said first positioning means for generating a voltage corresponding to the desired change in slope of said portion of said transfer characteristic, means coupled to said second positioning means for generating a voltage corresponding to the difference between the ordinate of said preselected coordinate point and the ordinate of the transfer characteristic at the abscissa of said preselected coordinate point, and output means coupled between said function generator and said first and second positioning means, said output means coupling the function generator output voltage component produced by said calibration voltage to said first positioning means, and coupling the function generator output voltage component produced by said input voltage to said second positioning means.

5. Apparatus for adjusting the transfer characteristic of a function generator to pass through a predetermined coordinate point with a predetermined slope, said function generator being provided with slope adjustment means for varying the slope of said transfer characteristic and break-point adjustment means for varying the position of said transfer characteristic, comprising in combination, input means coupled to said function generator for applying an input voltage to said function generator having a magnitude corresponding to the abscissa of said coordinate point, said input means periodically coupling a constant magnitude calibration voltage to said function generator, means producing a slope reference voltage having a magnitude corresponding to the product of the magnitude of said calibration voltage and the predetermined slope of said transfer characteristic, first comparison means coupled to said slope reference voltage producing means and to the output of said function generator for comparing said slope reference voltage with the peak-to-peak component of said function generator output voltage, first positioning means coupled to said first comparison means and to said slope adjustment means for varying said slope adjustment means until the peak-to-peak component of the output voltage of said function generator equals said slope reference voltage, means producing a position reference voltage corresponding to the ordinate of said coordinate point, second comparison means coupled to said position reference voltage producing means and to the output of said function generator for comparing said position reference voltage with the output voltage of said function generator during the intervals between applications of said constant magnitude calibration voltage to said function generator, and second positioning means coupled to said second comparison means and to said break-point adjustment means for varying said break-point adjustment means until the function generator output voltage during these intervals equal said position reference voltage.

6. Apparatus for adjusting the transfer characteristic of a function generator channel to pass through a predetermined coordinate point and a predetermined break-point, said function generator channel being provided with slope adjustment means for varying the slope of said transfer characteristic and break-point adjustment means for varying the position of said transfer characteristic, comprising in combination, input means coupled to said function generator for applying an input voltage to said function generator having a magnitude corresponding to the abscissa of said coordinate point, said input means periodically coupling a constant magnitude calibration voltage to said function generator, means producing a first incremental voltage corresponding to the difference between the abscissa of said coordinate point and said break-point, means producing a second incremental voltage corresponding to the ordinate of said coordinate point, means coupled to said first and second incremental voltage producing means for producing a slope reference voltage having a magnitude corresponding to the product of said constant magnitude calibration voltage and the ratio of said second incremental voltage to said first incremental voltage, first comparison means coupled to said slope reference voltage producing means and to the output of said function generator for comparing said slope reference voltage with the peak-to-peak component of said function generator output voltage, first positioning means coupled to said first comparison means and to said slope adjustment means for varying said slope adjustment means until the peak-to-peak component of the output voltage of said function generator equals said slope reference voltage, second comparison means coupled to said second incremental voltage producing means and to the output of said function generator for comparing said second incremental voltage with the output voltage of said function generator during the intervals between applications of said constant magnitude calibration voltage to said function generator, and second positioning means coupled to said second comparison means and to said break-point adjustment means for varying said break-point adjustment means until the function generator output voltage during these intervals equals said second incremental voltage.

7. Apparatus for altering the slope and position of a portion of the transfer characteristic of a function generator to pass through a preselected coordinate point displaced from the original transfer characteristic, said function generator having an uncalibrated channel provided with slope adjustment means for varying the slope of said portion of said transfer characteristic and break-point adjustment means for varying the position of said portion of said transfer characteristic, comprising in combination, means coupled to said function generator for disabling all previously calibrated function generator channels and energizing said uncalibrated channel, means producing a slope reference voltage corresponding to the desired change in slope of said transfer characteristic, means producing a position voltage corresponding to the difference between the ordinate of said preselected coordinate point and the ordinate of the transfer characteristic at the abscissa of said preselected coordinate point, input means coupled to said function generator for applying an input voltage to said function generator having a magnitude corresponding to the abscissa of said preselected coordinate point, said input means periodically coupling a constant magnitude calibration voltage to said function generator, first comparison means coupled to said slope reference voltage producing means and to the output of said function generator for comparing said slope reference voltage with the peak-to-peak component of said function generator output voltage, first positioning means coupled to said first comparison means and to said slope adjustment means for varying said slope adjustment means until the peak-to-peak component of the ouput voltage of said function generator equals said slope reference voltage, second comparison means coupled to said position voltage producing means and to the output of said function generator for comparing said position voltage with the output voltage of said function generator during the intervals between applications of said constant magnitude calibration voltage to said function generator, second positioning means coupled to said second comparison means and to said break-point adjustment means for varying said break-point adjustment means until the function generator output voltage during these intervals equal said position voltage, and means coupled to said function generator for energizing all of said previously calibrated channels of said function generator.

8. Apparatus for altering the slope of a portion of the transfer characteristic of a function generator to pass thorugh a predetermined coordinate point displaced from the original transfer characteristic where said predetermined coordinate point has an abscissa with a magnitude greater than that of the abscissa of the coordinate point at which change in slope is to occur, said function generator having an uncalibrated channel provided with slope adjustment means for varying the slope of said portion of said transfer characteristic and break-point adjustment means for varying the position of said portion of said transfer characteristic, comprising in combination, means producing a first incremental voltage corresponding to the difference between the abscissa of said predetermined coordinate point and the abscissa of the coordinate point at which said change in slope is to occur, input means coupled to said function generator for applying an input voltage to said function generator having a magnitude corresponding to the abscissa of said predetermined coordinate point, means producing a second incremental voltage corresponding to the difference between the ordinate of said predetermined coordinate point and the output of said function generator, means coupled to said function generator for disabling all previously calibrated channels of said function generator and energizing said uncalibrated channel, said input means periodically coupling a constant magnitude calibration voltage to said function generator, means coupled to said input means and to said first and second incremental voltage producing means for producing a slope reference voltage having a magnitude corresponding to the product of said constant magnitude calibration voltage and the ratio of said second incremental voltage to said first incremental voltage, first comparison means coupled to said slope reference voltage producing means and to the output of said function generator for comparing said slope reference voltage with the peak-to-peak component of said function generator output voltage, first positioning means coupled to said first comparison means and to said slope adjustment means for varying said slope adjustment means until the peak-to-peak component of the output voltage of said function generator equals said slope reference voltage, second comparison means coupled to said second incremental voltage producing means and to the output of said function generator for comparing said second incremental voltage with the output voltage of said function generator during the intervals between applications of said constant magnitude calibration voltage to said function generator, second positioning means coupled to said second comparison means and to said break-point adjustment means for varying said break-point adjustment means until the function generator output voltage during these intervals equals said second incremental voltage, and means coupled to said function generator for energizing all of said previously calibrated channels of said function generator.

9. Apparatus for setting a function generator to produce a predetermined ouptut voltage in response to a given input voltage, said function generator including at least one channel having first and second adjustment means, comprising input means coupled to said function generator for receiving an applied voltage, voltage transforming means adapted to receive first and second applied incremental voltages, said voltage transforming means converting said first incremental voltage to a calibration voltage having a constant predetermined magnitude and converting said second incremental voltage to a slope reference voltage having a magnitude corresponding to the product of said calibration voltage and the ratio of said second incremental voltage to said first incremental voltage, first and second voltage responsive positioning means coupled to the output of said function generator, means coupling said first and second positioning means respectively to said first and second adjustment means of the function generator channel to be calibrated, means coupling said second incremental voltage to said second positioning means, and switching means periodically and simultaneously coupling said calibration voltage to said input means, said slope reference voltage to said first positioning means, and rendering said second positioning means unresponsive to the output voltage from said function generator.

10. Apparatus for setting a function generator as defined in claim 9 wherein said voltage transforming means comprises first and second amplifying means adapted for receiving said first and second incremental input voltages respectively, voltage regulating means coupled to the output of said first amplifying means, and gain control means coupled between said voltage regulating means and said first and second amplifying means for controlling the gain of each of said amplifying means, said gain control means varying the gain of said first and second amplifying means until the output voltage of said first amplifying means has a predetermined magnitude.

11. Apparatus for setting a function generator as defined in claim 9 wherein said voltage transforming means comprises a first amplifier adapted to receive a first incremental voltage, said first amplifier including first variable impedance means for varying the gain thereof, a second amplifier adapted to receive a second incremental voltage, said second amplifier including second variable impedance means for varying the gain thereof, voltage regulator means connected between the output of said first amplifier and said first and second variable impedance means, said voltage regulating means being adapted to vary said first impedance means to maintain the output voltage of said first amplifier equal to a predetermined value and said second impedance means to maintain the ratio of the output voltages of said first and second amplifiers equal to the ratio of their input voltages.

12. Apparatus for producing a predetermined output voltage in response to a given input voltage comprising a function generator including at least one channel having first and second adjustment means, input means coupled to said function generator, voltage transforming means adapted to receive first and second incremental voltages, said voltage transforming means converting said first incremental voltage to a calibration voltage having a constant predetermined magnitude and converting said second incremental voltage to a slope reference voltage having a magnitude corresponding to the product of said calibration voltage and the ratio of said second incremental voltage to said first incremental voltage, first and second voltage responsive positioning means coupled to the output of said function generator, means coupling the outputs of said first and second positioning means respectively to said first and second adjustment means of the function generator channel to be calibrated, means coupling said second incremental voltage to said second positioning means, and switching means periodically and simultaneously coupling said calibration voltage to said input means, said slope reference voltage to said first positioning means, and rendering said second positioning means unresponsive to the output voltage from said function generator.

13. Apparatus for setting a function generator to produce a predetermined output voltage in response to a given input voltage, said function generator including at least one channel having first and second adjustment means comprising in combination, input means coupled to said function generator for receiving an applied voltage, calibration voltage generating means adapted to produce a constant magnitude output voltage, first and second voltage responsive positioning means coupled to the output of said function generator, means coupling the outputs of said first and second positioning means respectively to said first and second adjustment means of the function generator channel to be calibrated, slope computation means adapted to receive applied first and second incremental voltages, said slope computation means being coupled to said calibration voltage generating means and providing a slope reference voltage corresponding to the product of said constant magnitude output voltage and the ratio of said second incremental voltage to said first incremental voltage, means coupling said second incremental voltage to said second positioning means, and switching means periodically and simultaneously coupling said calibration voltage source to second input means, said slope reference voltage to said first positioning means, and rendering said second positioning means unresponsive to the output voltage from said function generator.

14. Apparatus for adjusting a function generator to obtain a predetermined transfer characteristic, said function generator being provided with first and second adjustment means for varying the slope and position respectively of said transfer characteristic, comprising input means coupled to said function generator, said input means being adapted to receive an input voltage corresponding to the abscissa of a preselected coordinate point through which said transfer characteristic is to pass and being further adapted to periodically receive a calibration voltage having a constant magnitude, first and second voltage responsive positioning means coupled respectively to said first and second adjustment means and to the output of said function generator, slope generating means for generating a voltage corresponding to the desired slope of said transfer characteristic at said preselected coordinate point, position generating means coupled to the output of said function generator for generating a voltage coresponding to the ordinate of said preselected coordinate point, and periodic switching means being first positioning means and to render said second position means insensitive to the output voltage from said function generator during the period that said calibration voltage is received by said input means.

15. Apparatus for adjusting a function generator to obtain a predetermined transfer characteristic, said function generator being provided with first and second adjustment means for varying the slope and position respectively of said transfer characteristic, comprising input means coupled to said function generator, said input means being adapted to receive an input voltage corresponding to the abscissa of a preselected coordinate point through which said transfer characteristic is to pass and being further adapted to periodically receive a calibration voltage having a constant magnitude, slope generating means for producing a voltage corresponding to the desired slope of said transfer characteristic at said preselected coordinate point, position generating means for producing a voltage corresponding to the ordinate of said preselected coordinate point, first voltage responsive positioning means having its output coupled to said first adjustment means, said first voltage responsive means having its input connected to the output of said function generator and to said slope generating means, second voltage responsive positioning means having its output coupled to said second adjustment means, said second voltage responsive positioning means having its input connected to the output of said function generator and to said position generating means, and means coupled to the output of said function generator and to said second voltage responsive means for varying the rate of adjustment of said second adjustment means inversely with the desired slope of said transfer characteristic.

16. In a diode function generator having a plurality of channels each provided with means for adjusting the slope of its ramp segment, the combination for automatically setting the slope of the ramp segment of one of said channels in accordance with a predetermined desired slope comprising means for supplying a first direct voltage to the input of said one channel, said first direct voltage having a magnitude greater than the break-point voltage of said channel, means periodically coupling a direct calibration voltage of constant magnitude to the input of said channel, slope generating means responsive to said direct calibration voltage for producing a voltage whose magnitude is equal to the product of the desired slope and the magnitude of said calibration voltage, error voltage producing means coupled to the output of said channel and to said slope generating means for producing an error control voltage, and voltage responsive positioning means coupled to said error voltage producing means and to the slope adjusting means of said channel for automatically setting the slope of the ramp segment of that channel.

17. The apparatus as defined by claim 16 wherein said slope generating means produces a direct slope reference voltage, and wherein said error voltage producing means compares the magnitude of said direct slope reference voltage with the peak-to-peak magnitude of the output voltage from said channel to produce said error control voltage.

18. In a multi-channel diode function generator system, the apparatus for computing the desired slope of the ramp section of one of the channels of said function generator system necessary to produce a predetermined resultant slope of a particular segment of the transfer characteristic of said function generator system comprising in combination, means disabling said one channel whose ramp section is to be set, means producing a first voltage having a magnitude and polarity corresponding to the predetermined break-point voltage of the ramp section of said one channel to be set, means producing a second voltage having a magnitude greater than said first voltage, means producing a first differential voltage equal to the difference between said second and first voltages, means coupling said second voltage to the input of said multi-channel diode function generator system, means producing a third voltage having a magnitude and polarity representing the ordinate of a predetermined point on the particular segment of the transfer characteristic to be produced by said function generator system corresponding to an abscissa represented by said second voltage, means producing a second differential voltage equal to the difference between said third voltage and the output of said multi-channel diode function generator system with said second voltage applied to its input, and means computing the ratio of said second differential voltage to said first differential voltage.

References Cited in the file of this patent

UNITED STATES PATENTS 2,831,107   Raymond et al. _________ Apr. 15, 1958

OTHER REFERENCES

"A New Diode Function Generator," IRE Transactions on Electronic Computers, June 1957, pp. 95–99.

Shen: Approximating Non Linear Functions, Electronic Engineering, September 1957, pp. 434–439.

UNITED STATES PATENT OFFICE
CERTIFICATE OF CORRECTION

Patent No. 2,964,709            December 13, 1960

Robert E. Mayer et al.

It is hereby certified that error appears in the above numbered patent requiring correction and that the said Letters Patent should read as corrected below.

Column 4, line 35, for "$r-x_1$." read -- $x=x_1$. --; column 7, line 58, for "regular" read -- regulator --; column 15, line 68, for "thorugh" read -- through --; column 18, line 22, for "coresponding" read -- corresponding --; line 23, after "being" insert -- adapted to couple said slope generating means to said --.

Signed and sealed this 1st day of May 1962.

(SEAL)
Attest:

ERNEST W. SWIDER            DAVID L. LADD
Attesting Officer            Commissioner of Patents